April 3, 1945. A. R. GRAD 2,372,825
SURFACE BROACHING MACHINE
Filed July 12, 1943 3 Sheets-Sheet 1

INVENTOR
ADOLF R. GRAD
BY
Wesley Merrill

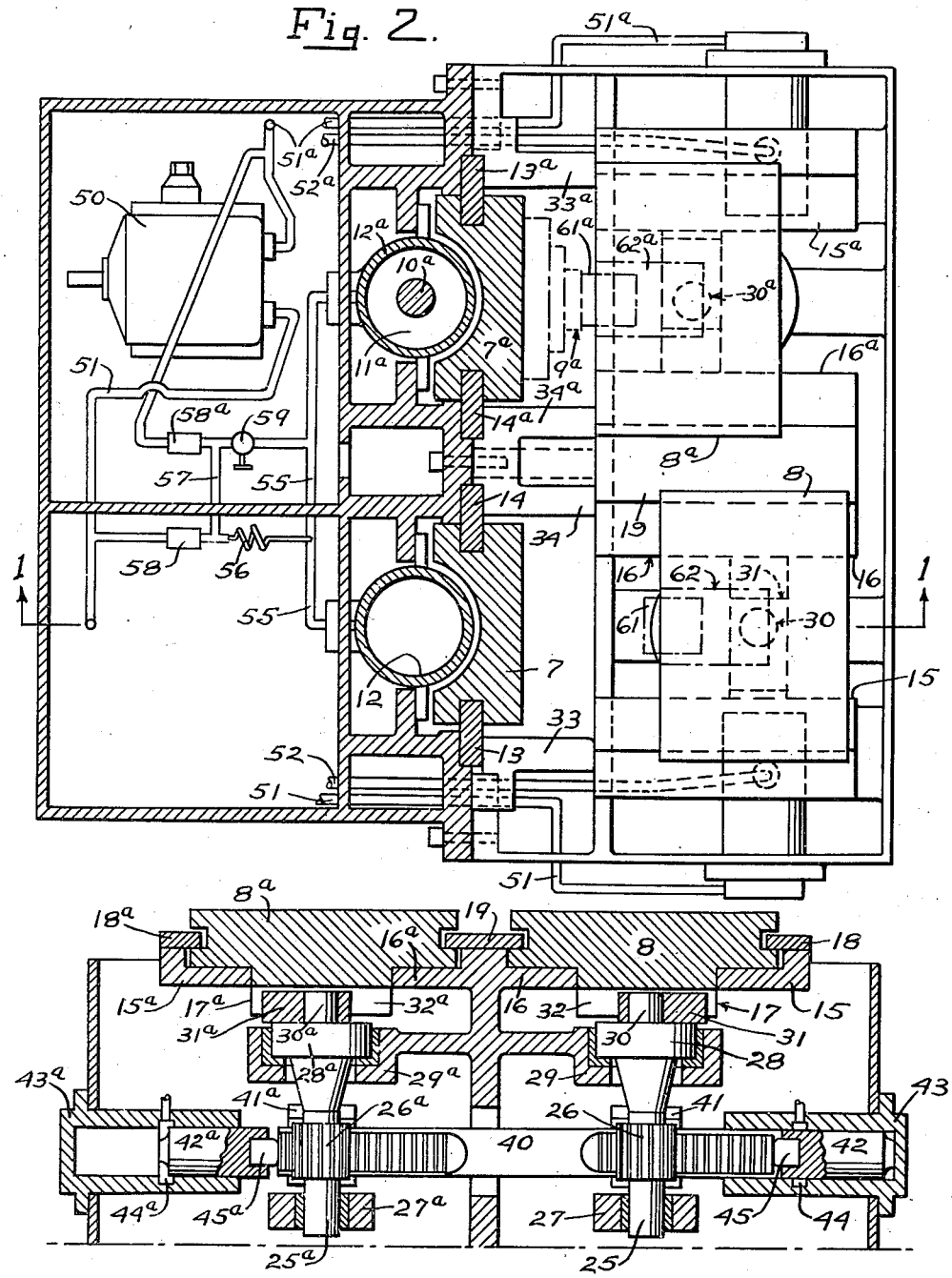

April 3, 1945. A. R. GRAD 2,372,825
SURFACE BROACHING MACHINE
Filed July 12, 1943 3 Sheets-Sheet 3

INVENTOR
ADOLF R. GRAD
BY
Wesley P. Merrill

Patented Apr. 3, 1945

2,372,825

UNITED STATES PATENT OFFICE 2,372,825

SURFACE BROACHING MACHINE

Adolf R. Grad, Wauwatosa, Wis., assignor to The Oilgear Company, Milwaukee, Wis., a corporation of Wisconsin Application July 12, 1943, Serial No. 494,324

10 Claims. (Cl. 90—33)

This invention relates to machine tools of the type having a tool carrier for moving a tool along a given path and a work carriage for moving work into the path of the tool to enable the tool to operate upon the work and then moving the work out of the path of the tool to permit it to be removed from the carriage, such as a surface broaching machine shown in U. S. Patent No. 2,190,642.

In a vertical broaching machine of this type, the force exerted by the broaching tool upon the work is resolved into a vertical component or cutting force, which forces the teeth of the broaching tool through the work and presses the work carriage against its support, and a horizontal component or push-off force which tends to move the work and the carriage away from the tool.

The magnitude of the push-off force relative to the magnitude of the cutting force will depend upon the hardness of the work, the type of operation being performed and the type of tool used. Sometimes the push-off force is at least as great as the cutting force.

In the broaching machine shown in the above patent, the work carrier is connected to the crank of a crankshaft which is rotated through a given angular distance to and from a dead center position to thereby advance and retract the carriage toward and from the path of the broaching tool. The carriage engages a positive stop just before the crank reaches dead center so that continued rotation of the shaft forces the carriage against the stop and pre-loads the carriage. That is, the carriage is urged against the stop by a force which is opposite in direction to the push-off force.

The above machine is highly successful and is in extensive commercial use but under certain conditions the push-off force is so great that it causes the carriage operating mechanism to yield slightly with a result that the work is not broached to a size within the extremely small limits ordinarily required.

The present invention has an object to provide a machine of the above character with a carriage operating mechanism which is capable of withstanding push-off forces of great magnitude.

Another object is to provide such a machine with a carriage operating mechanism which is simple and sturdy in construction.

Other objects and advantages will appear from the description hereinafter given of an embodiment of the invention.

According to the invention in its general aspect, the linkage between the crankshaft and the carriage of the prior machine is eliminated and the carriage is connected directly to the crank of a crankshaft which is journaled in bearings so arranged and constructed as to be capable of withstanding push-off forces of great magnitude.

The invention is exemplified by the broaching machine shown in part in detail and in part schematically in the accompanying drawings in which the views are as follows:

Fig. 2 is a sectional plan view taken on the irregular line 2—2 of Fig. 1.

Fig. 3 is a vertical section taken on the irregular line 3—3 of Fig. 1.

Figure 1:
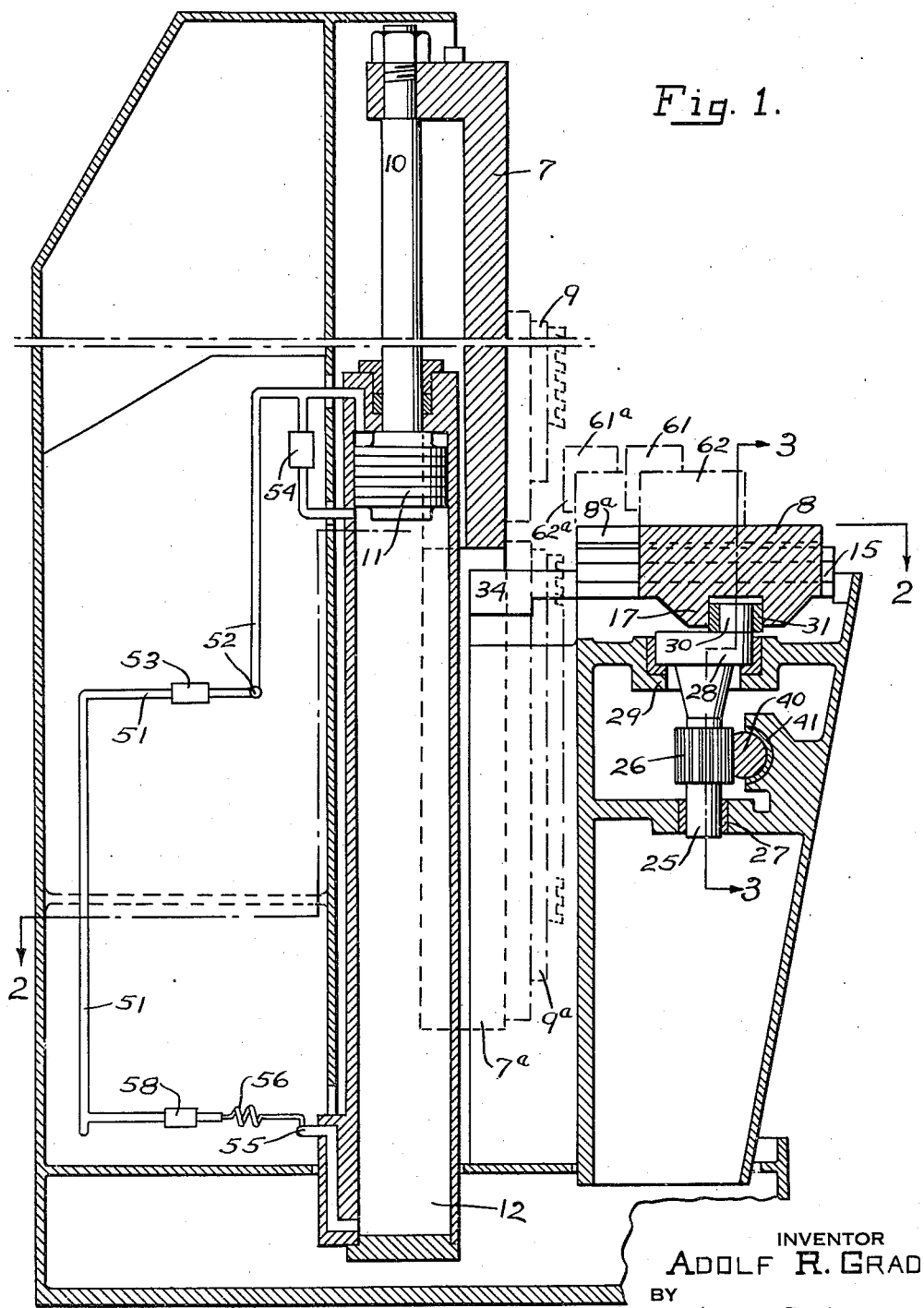
Fig. 1 is a vertical section through the machine taken on the line 1—1 of Fig. 2.
Figure 4:
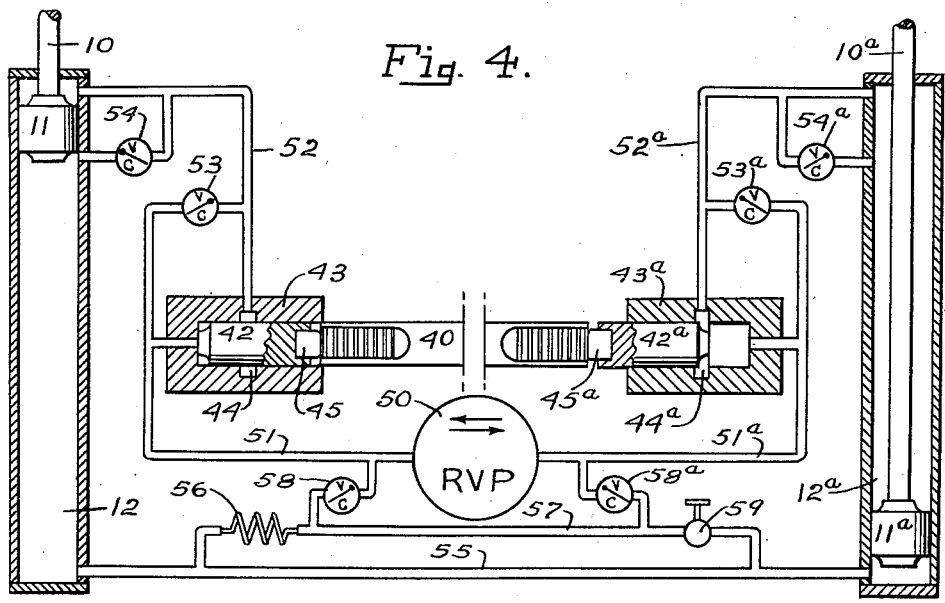
Fig. 4 is a diagram of the hydraulic circuit.

For the purpose of illustration, the machine has been shown provided with two alternately operating broaching units each of which includes a tool carrier and a work carriage but it is to be understood that the invention is equally applicable to a machine having but one broaching unit.

Figs. 1-4

The operating mechanism of the machine is carried by a frame which may be of ordinary construction. As shown, the frame consists of a rear section and a front section each of which has the several parts thereof formed into an integral structure as by being welded together or cast integral with each other. The two sections are rigidly but removably connected to each other as by being bolted together.

The machine is provided with two vertically reciprocable tool carriers or slides 7 and 7ª and two horizontally reciprocable work carriages 8 and 8ª which are arranged in front of slides 7 and 7ª respectively and adapted to move work into and out of the path of broaching tools 9 and 9ª carried by slides 7 and 7ª respectively, the mechanism being so arranged that when one carriage moves inward the other carriage moves outward and when one slide moves downward the other slide moves upward.

Slide 7 is connected at its upper end by a piston rod 10 to a piston 11 fitted in a cylinder 12 which is rigidly secured in a stationary position to the rear section of the frame and forms with piston 11 a hydraulic motor for reciprocating slide 7 upon two guides 13 and 14 arranged upon opposite sides thereof. Guides 13 and 14 are rigidly secured to the frame and are closely fitted in complementary grooves formed in slide 7 so that it is free to move vertically but is prevented from moving in any other direction.

Carriage 8 is supported upon and guided by two guides 15 and 16 which are fixed to the frame and arranged upon opposite sides of and in contact with a projection 17 formed upon the underside of carriage 8. A gib 18 is fixed to the upper side of guide 15 and extends into and engages the lower surface of a groove formed in the outer edge of carriage 8, and a gib 19 is fixed to the frame and has its opposite sides extending into and in contact with the lower surfaces of grooves formed in the adjacent edges of carriages 8 and 8a. The arrangement is such that carriage 8 is free to move toward and from slide 7 but is prevented from moving in any other direction.

The mechanism for reciprocating carriage 8 includes a crankshaft 25 which has a pinion 26 fixed thereon intermediate the ends thereof and which has its lower end journaled in a stationary bearing 27 carried by the frame. The upper end of shaft 25 is enlarged to provide a large bearing portion 28 which is journaled in a bearing 29 arranged close to the under-side of projection 17 and rigidly secured in a stationary position as by being fixed to or formed integral with the frame. The bearing portion 28 of shaft 25 has a crank pin 30 fixed therein or formed integral therewith and offset from the shaft axis. Crank pin 30 is closely journaled in a bearing block 31, which is closely fitted in a slot 32 formed in projection 17 transversely thereof. The arrangement is such that, when shaft 25 is rotated in one direction or the other, crank pin 30 will move carriage 8 toward or from slide 7 and block 31 will move along slot 32.

Inward movement of carriage 8 is positively limited by two stops 33 and 34 which are fixed to the frame and, for the sake of simplicity, have been shown as solid stops but in practice the stops are adjustable so that the inward movement of the carriage may be accurately limited.

The means for guiding and operating tool slide 7a and work carriage 8a are the same as but opposite hand to the above described means for guiding and operating tool slide 7 and work carriage 8 so that a description thereof is unnecessary, corresponding parts being designated by corresponding reference numerals with the exponent "a" added to the reference numerals applied to the means for guiding and operating slide 7a and carriage 8a.

Crankshafts 25 and 25a are so adjusted that each crank pin will be at dead center when the carriage connected thereto is fully advanced and the other crank pin will be in such a position that the carriage connected thereto will be fully retracted so that simultaneous rotation of the shafts through a given angular distance to and from the dead center position will cause the carriages to be alternately reciprocated between fully advanced and fully retracted positions.

In order that crankshafts 25 and 25a may be rotated simultaneously, pinions 26 and 26a mesh with rack teeth formed upon a rack bar 40 which is suitably supported in such a manner that it may be reciprocated transversely of the machine and the rack teeth thereon retained in proper mesh with pinions 26 and 26a. As shown, rack bar 40 is slidably mounted in two half-bearings 41 and 41a which are carried by the frame and rigidly held thereby in stationary positions.

Rack bar 40 is reciprocated by a hydraulic motor which is ordinarily connected in series with the broaching motors. As shown, rack bar 40 is adapted to be reciprocated by two pistons 42 and 42a fitted, respectively, in two cylinders 43 and 43a which are carried by the frame and have internal annular grooves or ports 44 and 44a formed therein, respectively, in such locations that the port in each cylinder is covered by the piston in that cylinder until that piston has nearly completed its advance movement.

In order that the carriage operating mechanism may be so adjusted that one of crank pins 30 and 30a will be at dead center when rack bar 40 reaches the limit of its movement in one direction and the other crank pin will be at dead center when rack bar 40 reaches the limit of its movement in the other direction, motion is transmitted to rack bar 40 from pistons 42 and 42a, respectively, through two filler blocks 45 and 45a which may be cut to the exact length necessary to stop rack bar 40 when either crank pin reaches dead center.

Liquid for operating the motor is supplied by a pump 50 arranged in the rear section of the frame and driven in any suitable manner, such as by an electric motor (not shown) mounted upon a platform arranged immediately above the pump which is a common practice. The lower part of the frame constitutes a reservoir from which the pump may draw liquid to fill the hydraulic circuit.

The hydraulic motors may be reversed either by means of a reversing valve or by reversing the pump. As shown, pump 50 is reversible and has its two ports connected, respectively, by channels 51 and 51a to the outer ends of cylinders 43 and 43a the ports 44 and 44a of which are connected, respectively, by channels 52 and 52a to the upper ends of cylinders 12 and 12a.

Channels 51 and 51a are also connected, respectively, to channels 52 and 52a through two check valves 53 and 53a which permit liquid to flow from channels 52 and 52a into channels 51 and 51a, respectively, but prevent flow in the opposite direction. Channels 52 and 52a are also connected through check valves 54 and 54a, respectively, to cylinders 12 and 12a at points spaced from the upper ends thereof so that liquid can escape from each of cylinders 12 and 12a after the piston therein has reached its uppermost position but liquid cannot flow from channels 52 and 52a to the under-sides of pistons 11 and 11a.

The lower ends of cylinders 12 and 12a are connected to each other by a channel 55 so that, when liquid is delivered by pump 50 to the upper end of one cylinder to move the piston therein downward on a working stroke, the liquid expelled by the piston from that cylinder will flow through channel 55 to the other cylinder and move the piston therein upward on a return stroke.

In order that either one of pistons 11 and 11a may reach the end of its return stroke before the other piston reaches the end of its working stroke, channel 55 is connected through a choke 56 to a channel 57 which is connected to channel 51 and 51a, respectively, through two check valves 58 and 58a so that liquid may flow at a limited rate into channel 55 from the channel 51 or 51a that is the high pressure channel but liquid cannot flow from channel 55 into the channel 51 or 51a that is the low pressure channel. Channel 57 is also connected to channel 55 through a normally closed shut-off valve 59 which may be opened to shorten the broaching stroke as will presently be explained.

The mechanism for controlling the machine has not been illustrated as it forms no part of the present invention and as any suitable control may be employed. For example, a suitable control mechanism that is in common use includes a pump control which is biased to neutral so that the pump is normally at zero stroke, two solenoids for operating the pump control in one direction or the other to cause the pump to deliver liquid in one direction or the other, a normally open starting switch for energizing each solenoid and a normally closed limit switch for deenergizing each solenoid, the two starting switches being manually operable and each limit switch being operated in response to a tool slide reaching the end of its down stroke so that, when one or the other of the starting switches is closed, one or the other of the solenoids will be energized and cause the pump to deliver liquid in one direction or the other, thereby causing the machine to operate in one direction until the downward moving tool slide opens a limit switch to energize the solenoid and then the pump control reduces pump displacement to zero and the machine comes to rest.

Operation

Assuming that the parts are in the positions shown in Figs. 1 to 4, that pump 50 is running, that broaching tool 9a has completed its operation upon a work piece 61a fastened in a work holder or fixture 62a which is fixed to carriage 8a, and that an unfinished work piece 61 is fastened in a fixture 62 which is fixed to carriage 8, the machine will operate as follows:

The operator adjusts the control mechanism, as by closing a starting switch, to cause pump 50 to discharge liquid into channel 51. Since the liquid discharged by pump 50 cannot flow directly into channel 52 due to check valve 53, it first enters cylinder 43 and causes piston 42 to move rack bar 40 toward the right in respect to Fig. 4 or toward the left in respect to Fig. 3 into the position shown in Fig. 5.

Rack bar 40 will rotate crankshafts 25 and 25a to cause crank pin 30 to move carriage 8 inward and to move carriage 8a outward to thereby move work 61 into position to be broached by tool 9 and to move work 61a out of the path of tool 9a and into a position where it may be readily removed from fixture 62a and a new work piece fastened therein. Carriage 8a engages stops 33 and 34 just before crank pin 30 reaches dead center and then the inertia of the moving masses and the pressure acting upon piston 42 continues the rotation of crankshaft 25 until crank pin 30 is at dead center and then piston 42a engages the end of cylinder 43a and stops crank pin 30 on dead center.

In moving to dead center from the position occupied by it at the instant that carriage 8 engages its stops, crank pin 30 urges carriage 8 against stops 33 and 34 with a force of great magnitude which not only takes up all slack in the structure but also preloads the carriage. That is, carriage 8 is initially subjected to a very large force which is opposite in direction to the push-off force to which carriage 8 will be subjected during the broaching operation.

At about the instant that carriage 8 engages stops 33 and 34, piston 42 starts to uncover port 44 and, when it is fully uncovered, the liquid discharged by pump 50 may flow freely therethrough and through channel 52 to the upper end of cylinder 12 and cause piston 11 to move tool slide 7 downward to enable tool 9 to operate upon work 61.

As previously explained, the force exerted by tool 9 upon work 61 is resolved in a vertical component or cutting force and a horizontal component or push-off force. The cutting force presses carriage 8 against guides 15 and 16 which are amply able to withstand any force transmitted thereto through a tool. Tilting of carriage 8 by the cutting force due to overhang of the work is prevented by gibs 18 and 19. The push-off force tends to move carriage 8 outward but it cannot do so for the reason that carriage 8 was preloaded in a direction opposite to the push-off force, as explained above, and the bearing portion 29 of shaft 25 is so large and is arranged so close to carriage 8 that it is capable of withstanding forces of great magnitude without yielding.

During the down stroke of piston 11, the liquid in the lower part of cylinder 12 is expelled therefrom and flows through channel 55 to the lower end of cylinder 12a and causes piston 11a to move slide 7a upward on an idle or return stroke, the liquid in the upper part of cylinder 12a being expelled therefrom through channel 52a, check valve 53a and channel 51a to the intake of pump 50.

Since cylinders 12 and 12a have the same displacement, the liquid ejected from the lower end of cylinder 12 to the lower end of cylinder 12a tends to move piston 11a upward at the same rate that piston 11 moves downward but during this time liquid is flowing at a limted rate from pump 50 through channel 51, check valve 58, channel 57 and choke 56 into channel 55 so that liquid is delivered to the lower end of cylinder 12a at a rate slightly in excess of the rate at which liquid is expelled from the lower end of cylinder 12, thereby causing piston 11a to move upward faster than piston 11 moves downward. Consequently, piston 11a will reach the end of its up stroke before piston 11 reaches the end of its down stroke and then the liquid supplied to the lower part of cylinder 12a will escape therefrom through check valves 54a and 53a into return channel 51a.

When piston 11 reaches the end of its down stroke, at which time work 61 will have been broached by tool 9, the control mechanism is operated to reduce the displacement of pump 50 to zero and bring the machine to rest, thereby completing a half cycle of operation during which the operator removes the finished work from fixture 62a and fastens a new work piece therein.

After a new work piece is fastened in place upon carriage 8a, the control mechanism is adjusted to cause pump 50 to deliver liquid into channel 51a and the machine to operate as described above except that the flow of liquid and the carriage and slide movements are in the reverse direction. That is, carriage 8 will be moved outward and carriage 8a will be simultaneously moved inward and preloaded and then slide 7a will move downward to enable tool 9a to operate upon the new work piece and slide 7 will be simultaneously moved upward as will appear from the explanation hereinafter given of the operation of the hydraulic circuit shown schematically in Fig. 5.

If it is desired to shorten the stroke of the machine, shutoff valve 59 is opened and pump 50 is adjusted to deliver liquid to the cylinder containing the piston which is at the end of its upstroke.

For example, if the parts are in the positions shown in Figs. 1 to 4 and it is desired to shorten the stroke, valve 59 is opened and then pump 61 is adjusted to deliver liquid into channel 51. The liquid will first move piston 42 and rack bar 40 toward the right to advance carriage 8 and retract carriage 8a, as previously explained, and then it will flow through check valve 58, channel 57, shutoff valve 59 and channel 55 to the lower end of cylinder 12a and move piston 11a upward. The liquid will tend to flow from channel 51 through cylinder 43 and channel 52 to the upper end of cylinder 12 and move piston 11 downward but it cannot do so for the reason that both faces of piston 11 are subjected to the same pressure.

Piston 11a is moved upward a distance at least twice as great as the distance the stroke is to be shortened and it is ordinarily raised to its upper limit and then the displacement of pump 50 is reduced to zero, valve 59 is closed and the limit switch actuator or other stroke limiting device associated with each of the tool slides is adjusted to the desired position.

When pump 50 is adjusted to deliver liquid into channel 51, the liquid will flow through cylinder 43 and channel 52 to cylinder 12 and move piston 11 downward. The liquid ejected from cylinder 12 by piston 11 will flow through channel 55, cylinder 12a and check valves 54a and 53a into return channel 51a, piston 11a being moved upward by the liquid if it had not previously been moved to its upper limit. Thereafter, the machine will operate in the above described manner but at a shorter stroke. If it is then desired to lengthen the stroke, it is simply necessary to lower the stroke limiting devices to the desired positions and then the excess liquid in the lower part of each slide motor cylinder will be discharged through the check valve associated with the other cylinder.

Figure 5:
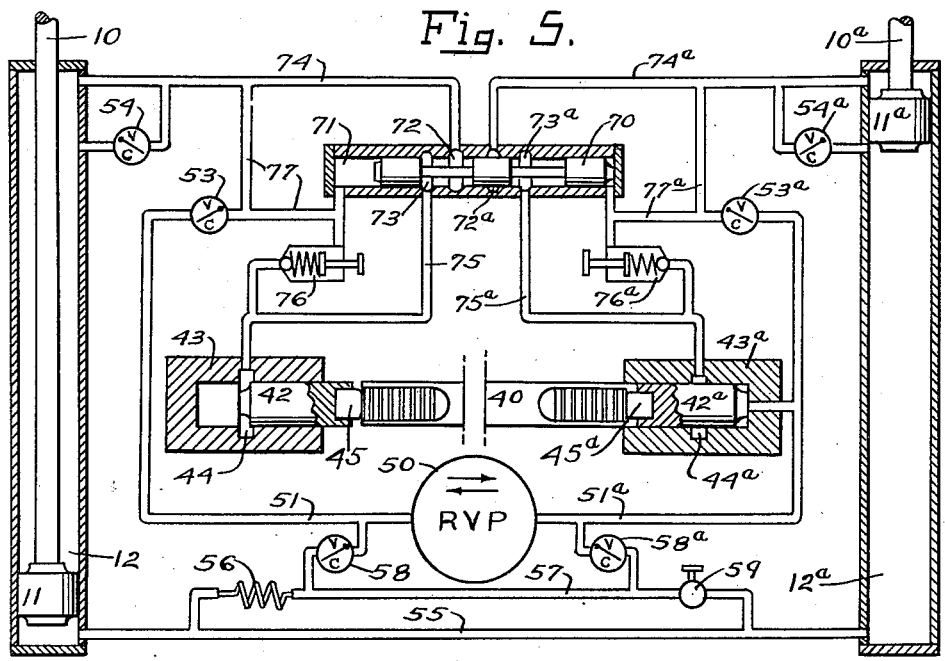
Fig. 5 is a diagram of a modified hydraulic circuit, the pistons of the broaching machine and the rack bar for operating the carriage being shown in positions opposite to those shown in Fig. 4.

*Fig. 5*

Under certain conditions, the inertia of the moving parts and the pressure exerted by the motive liquid upon the carriage operating piston at the time that a carriage engages its stop may not be great enough to preload the carriage sufficiently to prevent it from yielding under the lateral component of the broaching force. If the carriage is to be subjected to excessive push-off forces, the pressure of the motive liquid supplied to the work carriage motor may be increased to a very high value before the work slide motor is operated such as in the drive shown in Fig. 5 in which a pressure operated valve is interposed between the carriage motors and the slide motors. Since the drive is otherwise the same as the drive shown in Figs. 1 to 4, like parts have been indicated by like reference numerals and only a brief description of the drive will be given.

As shown, communication between the carriage motors and the tool slide motors is controlled by a valve 70 fitted in the bore of a valve casing 71 having two spaced apart annular grooves or ports 72 and 73 formed therein upon one side of its centerline and two spaced apart annular grooves or ports 72a and 73a formed therein upon the other side of its centerline. Ports 72 and 72a are connected to upper ends of cylinders 12 and 12a, respectively, by two channels 74 and 74a. Ports 73 and 73a are connected to ports 44 and 44a in cylinders 43 and 43a, respectively, by two channels 75 and 75a. When valve 70 is in the position shown, it blocks communication between channels 74a and 75a and, when it is shifted toward the left to its other position, it blocks communication between channels 74 and 75.

Valve 70 is adapted to be shifted only after the pressure in one or the other of cylinders 43 and 43a reaches a very high value. This is accomplished by connecting opposite ends of valve casing 71 to channels 75 and 75a, respectively, through two resistance valves 76 and 76a which open at a very high pressure.

In order that liquid may be ejected from the ends of valve casing 71 when valve 70 is shifted and in order that liquid may be returned to pump 50 from the upper end of each of cylinders 12 and 12a during the return stroke of the piston therein, channels 74 and 74a are connected by branched channels 77 and 77a, respectively, to opposite ends of valve casing 71 and to the inlets of check valves 53 and 53a the outlet of which are connected, respectively, to channels 51 and 51a as previously explained.

Assuming that the parts are in the positions indicated in Fig. 5 and that pump 50 has been adjusted to deliver liquid through channel 51a to cylinder 43a, the liquid will move piston 42a and rack bar 40 toward the left which will cause shafts 25 and 25a to be rotated so that carriage 8 is moved outward and carriage 8a is moved inward.

Piston 42a will uncover port 44a but liquid cannot at first flow therethrough to the upper end of cylinder 12a for the reason that valve 70 is blocking communication between channels 75a and 74a. Consequently, continued delivery of liquid from pump 50 to cylinder 43a causes the pressure to rise until it is high enough to open valve 76a and this pressure acting upon piston 42a is in excess of the pressure required to move crank pin 30a to dead center and to cause it to urge carriage 8a against its stops with a force of great magnitude.

As soon as valve 76a opens, liquid will flow therethrough and tend to flow through channels 77a and 74a to the upper end of cylinder 12a and move piston 11a downward but it cannot do so for the reason that piston 11a in moving downward must move piston 11 upward and the liquid entering cylinder 12a does not have sufficient pressure due to the drop in pressure across valve 76a. Consequently, the liquid flowing through valve 76a will enter valve casing 71 and cause valve 70 to move to its left hand position and eject liquid from valve casing 71 through channel 77 and check valve 53 into return channel 51.

Shifting valve 70 permits liquid to flow from pump 50 through channel 51a, cylinder 43a, channel 75a, valve casing 71 and channel 74a to the upper end of cylinder 12a and cause piston 11a to move downward on a working stroke and to eject liquid from cylinder 12a through channel 55 to the lower end of cylinder 12 to move piston 11 upward on an idle stroke, liquid being ejected by piston 11 from cylinder 12 through channels 74 and 77 and check valve 53 into return channel 51.

After piston 11a has completed its down stroke and the control mechanism has been operated to cause pump 50 to deliver liquid into channel 51, the drive will operate in the above described manner but in the opposite direction, resistance valve 76 preventing motor 11—12 from being operated until the pressure in cylinder 43 has reached a very high value.

The drive described herein is susceptible of various modifications and adaptations without departing from the scope of the invention which is hereby claimed as follows.

I claim:

1. In a machine having a tool carrier for moving a cutting tool along a fixed path, a work carriage for supporting work in the path of said tool, a stationary support for said carriage, power means for reciprocating said carriage to enable said tool to operate upon said work, the force transmitted through said tool to said work being resolved into an axial component which presses said carriage against said support and a lateral component which urges said carriage away from the path of said tool, the combination of a bearing rigidly fixed in a stationary position close to said carriage, a shaft journaled in said bearing, a crank fixed to said shaft and connecting it to said carriage for alternately advancing and retracting said carriage to thereby move said work into and out of the path of said tool in response to rotation of said shaft in opposite direction alternately, means for rotating said shaft through a predetermined angular distance to and from a dead center position, a stop rigidly secured in such a stationary position that said carriage during advance movement thereof engages said stop before said crank reaches dead center, and means for stopping said crank at dead center, said shaft rotating means being capable of forcing said crank to dead center position in which the centers of said shaft and said crank are arranged in a line parallel to said lateral component so that said component cannot impart rotation to said shaft and said carriage being preloaded in a direction opposite to the direction of said lateral component.

2. A mechanism according to claim 1 characterized by the machine having two work carriages, a shaft for operating each carriage, a pinion on each shaft, a rack bar meshing with both of said pinions, and means for moving said bar in one direction or the other to thereby rotate said shafts and operate said carriages simultaneously.

3. A mechanism according to claim 1 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor.

4. A mechanism according to claim 1 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor, said mechanism also including means for preventing said carrier motor from operating until said carriage is fully preloaded.

5. A mechanism according to claim 1 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor, said mechanism also including a valve for controlling said carrier motor and having hydraulic valve operating means, and means including a resistance valve for directing motive liquid to said valve operating means only after the pressure of said liquid has reached a predetermined high value.

6. In a machine having a tool carrier for moving a tool along a fixed path, power means for reciprocating said carrier, a work carriage for supporting work upon one side thereof and movable in opposite directions along a path substantially at right angles to the path of said tool to move said work into and out of the path of said tool, the combination of a large bearing rigidly fixed in a stationary position close to the other side of said carriage, a shaft journaled in said bearing, carriage reciprocating means carried by said shaft eccentric thereto and having a rotatable and slidable connection with said carriage to alternately advance and retract said carriage toward and from the path of said tool during rotation of said shaft in opposite directions, means for rotating said shaft in one direction or the other selectively, and a stop rigidly secured in such a stationary position that said carriage during advancement thereof engages said stop before said carriage reciprocating means is rotated to such a position that a line passing therethrough and through the axis of said shaft is parallel to the path of said carriage whereby continued rotation of said shaft preloads said carriage.

7. A mechanism according to claim 6 characterized by the machine having two work carriages, a shaft for operating each carriage, a pinion on each shaft, a rack bar meshing with both of said pinions, and means for moving said bar in one direction or the other to thereby rotate said shafts and operate said carriages simultaneously.

8. A mechanism according to claim 6 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor.

9. A mechanism according to claim 6 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor, said mechanism also including means for preventing said carrier motor from operating until said carriage is fully preloaded.

10. A mechanism according to claim 6 characterized by the carrier reciprocating means being a hydraulic motor and the shaft rotating means comprising a pinion fixed to said shaft, a rack meshing with said pinion and a hydraulic motor for reciprocating said rack and for controlling the flow of motive liquid to said carrier motor, said mechanism also including a valve for controlling said carrier motor and having hydraulic valve operating means, and means including a resistance valve for directing motive liquid to said valve operating means only after the pressure of said liquid has reached a predetermined high value.

ADOLF R. GRAD.